Patented June 24, 1930

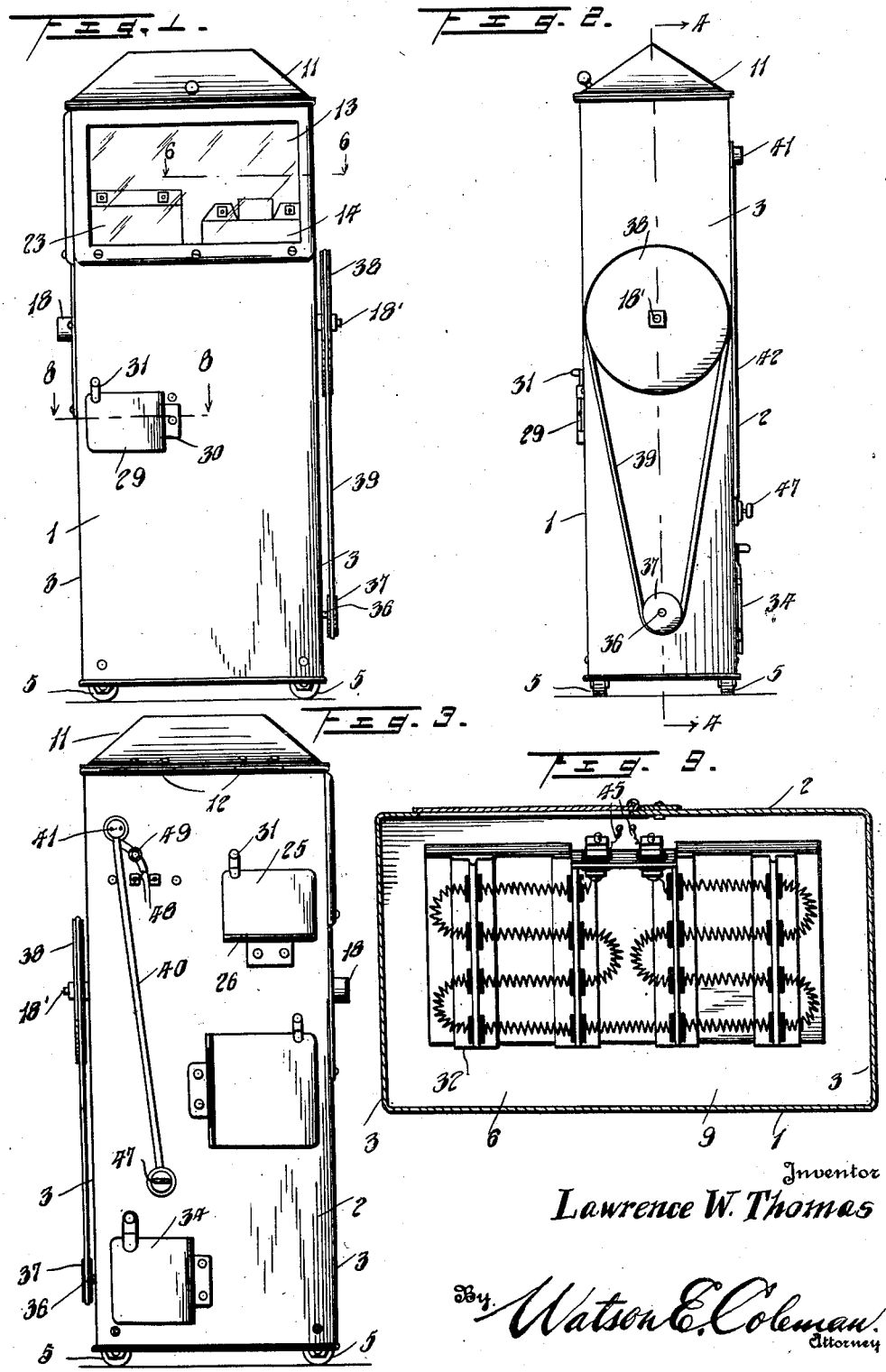

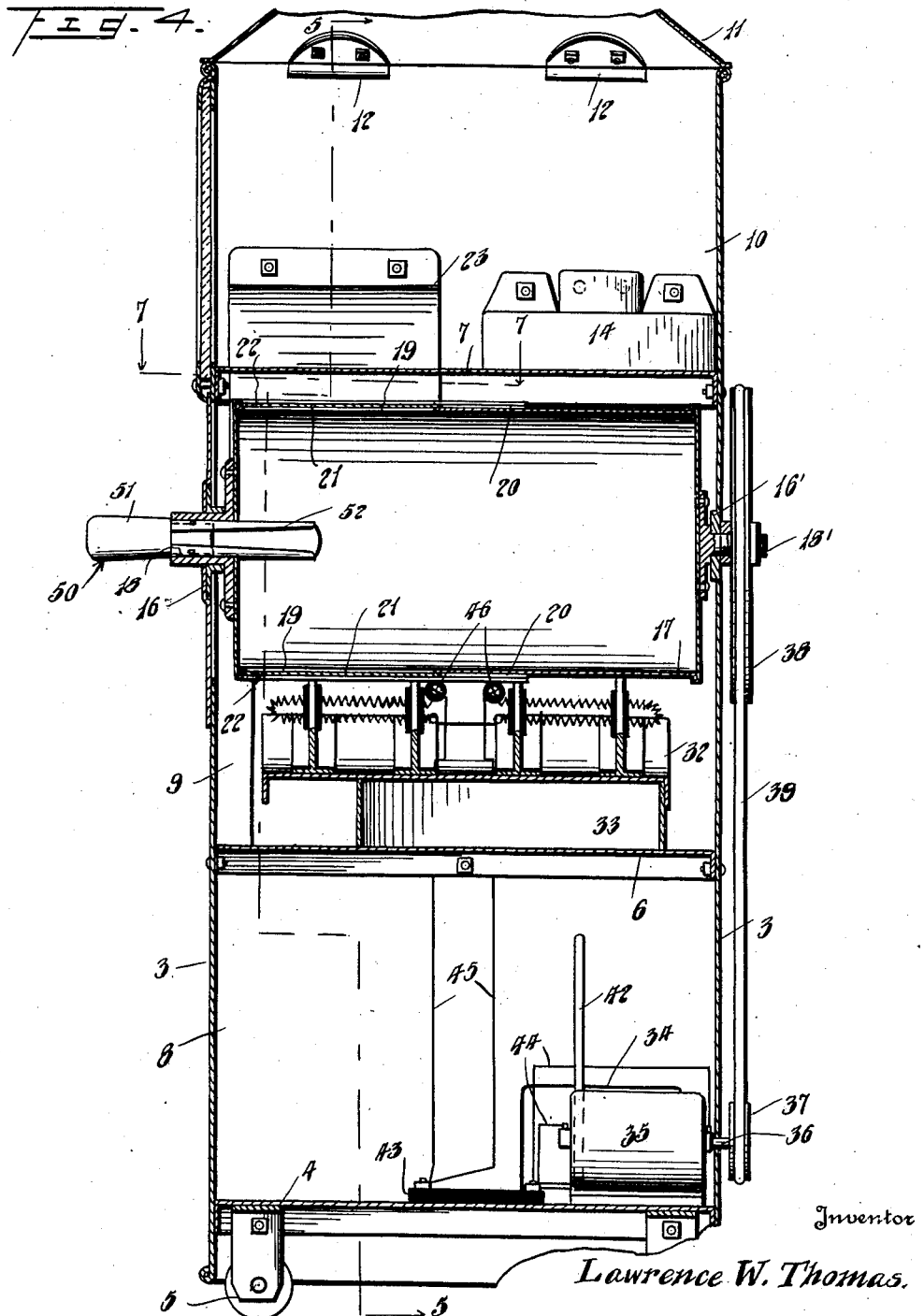

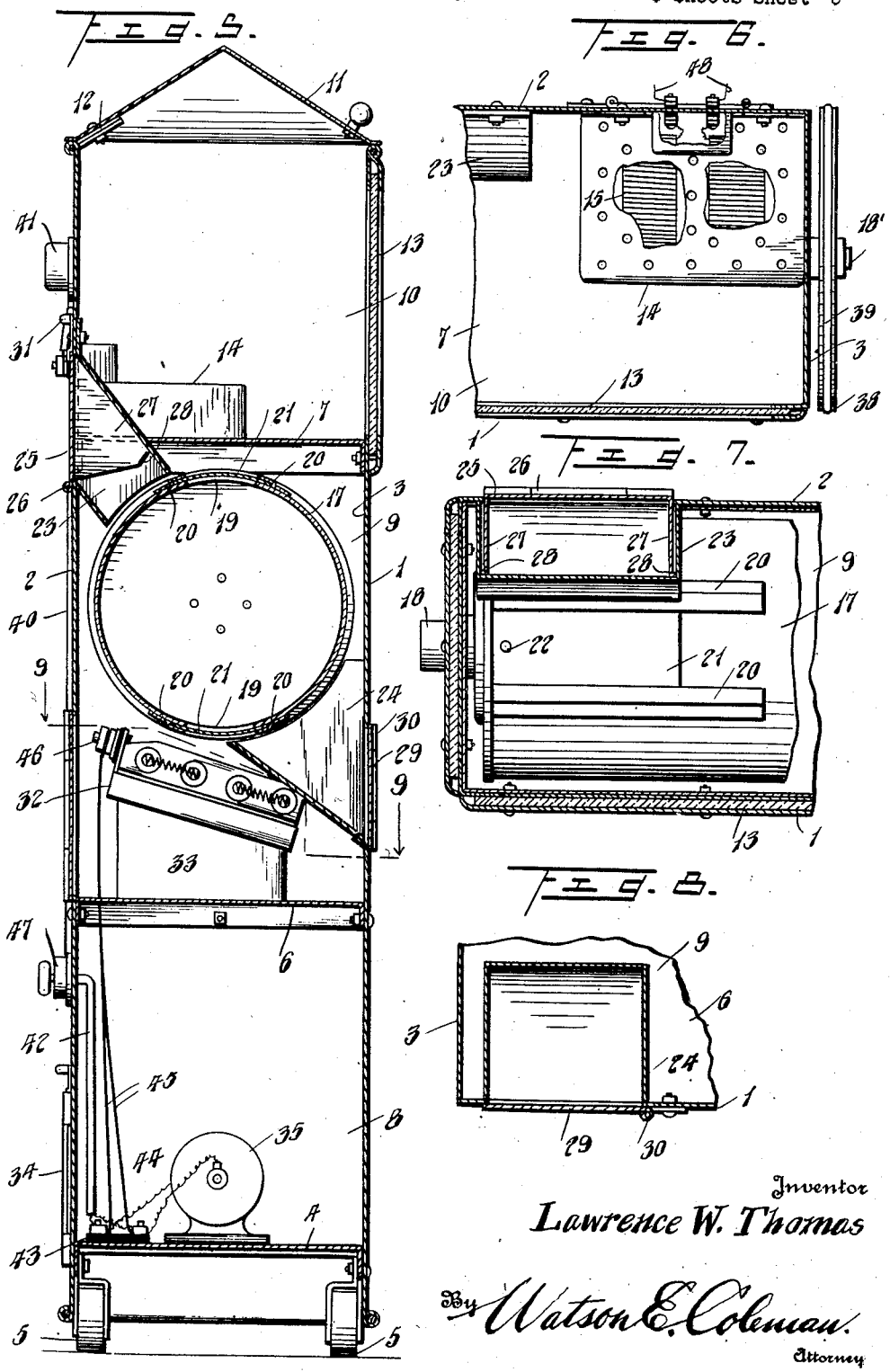

1,766,846

UNITED STATES PATENT OFFICE

LAWRENCE WILLIE THOMAS, OF MARION, SOUTH CAROLINA

PEANUT ROASTER

Application filed September 10, 1929. Serial No. 391,645.

This invention relates to roasting and warming machines and pertains particularly to an improved roaster or parcher for peanuts and means associated therewith for keeping the same in warm condition until wanted for use.

The primary object of the present invention is to provide a roaster having a revolving cylinder in which the nuts are placed with new and novel means for introducing the nuts thereto and removing them therefrom after the necessary roasting period is completed.

Another object of the invention is to provide a peanut roaster having a rotating cylinder which is encased and hidden from view, in which improved means is employed for reaching the cylinder to open the same for introduction or removal of the nuts.

The invention broadly contemplates the provision of a structure formed to provide a series of vertically disposed chambers in the lower one of which a suitable operating motor is mounted which is employed for rotating a roasting drum mounted in an intermediate chamber. The upper chamber of the structure is partially glass walled and constitutes a warming chamber for the roasted nuts, means being provided for keeping the interior of the chamber hot.

The roasting cylinder is provided with a pair of sliding doors and extending through the upper part of the structure at an oblique angle downwardly toward the axial center of the drum is a chute with the lower end of which the drum door is aligned when peanuts are to be introduced thereinto. Diametrically opposite the first mentioned chute a downwardly extending second chute is formed which opens through the front of the structure and which is also arranged for alignment with the drum door to facilitate removal of the roasted nuts therefrom.

The invention will be best understood from a consideration of the following detailed description taken in connection with the accompanying drawings forming a part of the present specification with the understand, however, that the invention is not confined to any strict coformity with the showing of the drawings but may be changed or modified so long as such changes or modifications mark no material departure from the salient features of the invention, as expressed in the appended claims.

In the drawing:—

Figure 1 is a view in front elevation of the roaster embodying the present invention.

Figure 2 is a side elevational view of the same.

Figure 3 is a view in rear elevation of the roaster.

Figure 4 is a sectional view taken on the line 4—4 of Figure 2.

Figure 5 is a vertical sectional view taken upon the line 5—5 of Figure 4.

Figure 6 is a sectional view taken on the line 6—6 of Figure 1.

Figure 7 is a sectional view taken on the line 7—7 of Figure 4.

Figure 8 is a sectional view taken on the line 8—8 of Figure 1.

Figure 9 is a sectional view taken on the line 9—9 of Figure 5.

Referring more particularly to the drawings wherein like numerals of reference indicate corresponding parts throughout the several views, the structure embodying the present invention comprises an upright rectangular cabinet having the front, back and side walls numbered 1, 2 and 3 respectively and a bottom wall 4, to the underside of which are secured suitable supporting casters 5. Within the cabinet 2 vertically spaced floors 6 and 7 are positioned forming the chambers 8, 9 and 10 which constitute the motor chamber, the roaster cylinder chamber and the warming chamber respectively. The top of the cabinet is closed by the lid 11 which is hinged as at 12 so that it may be raised to completely open the top chamber when roasted peanuts are to be placed therein or removed therefrom.

The roasting chamber 10 has the front wall and one side wall replaced by glass panels or windows 13 so that the contents of the chamber may be seen from without and mounted in the bottom of the warming chamber under a perforated housing or plate

14 is an electric heating unit 15 by means of which the nuts placed in the chamber and behind the housing 14 may be kept in heated condition.

The side walls of the roasting cylinder chamber 9 have mounted thereon bearings 16 and 16' and within and extending transversely of the chamber in a metal roasting cylinder 17 to the central portion of the end walls of which the trunnions 18 and 18' are secured, the trunnion 18' extending through the bearing 16' to the exterior of the structure while the trunnion 18 is mounted in the bearing 16, in the usual manner.

The roasting cylinder 17 is provided, adjacent one end and at diametrically opposite points in the wall thereof, with the door openings 19 and at each longitudinal side of each door opening a trap channel 20 is arranged between which channels is slidably mounted a door 21. At one end each of the doors is provided with an aperture 22 in which a pointed instrument may be engaged to shift the door to open or closed position, as desired.

Extending through the back wall of the heating chamber 10 downwardly through the floor 7 and at an angle toward the front of the structure is a charging chute 23, the lower end of the chute terminating in close proximity to the wall of the cylinder 17 and at a point thereover where either of the doors 19 may be brought into alignment therewith. The chute, as shown, is directed toward the radial center of the cylinder and diametrically opposite the chute 23 beneath the cylinder is a discharge chute 24, which is in alignment with the chute 23 and opens at its lower end through the front wall of the cabinet adjacent the lower portion of the chamber 9 in which the cylinder is housed.

Closing the inlet end of the charge chute 23 is a door 25 which is hinged at its lower edge, as indicated by the numeral 26, so that it may be dropped out and at each side of the door are the triangular wings 27 each of which has a lateral wing 28 which engages a suitable stop at the entrance to the chute to limit the outward movement of the door. At the outlet end of the discharge chute 24 a drop door 29 is positioned, this door being hingedly attached to the front wall of the cabinet at its lower edge, as indicated at 30. Suitable latches 31 may be provided for maintaining the door in closed position.

Within the cylinder chamber 9 directly beneath the cylinder and supported upon the floor 6 is an electrically heated plate 32 mounted upon a suitable base 33 to bring it into close proximity to the cylinder.

Opening through the back wall of the cabinet into the motor chamber 8 is a door 34 through which access is had to the interior of the chamber wherein is mounted an electric motor 35, the shaft 36 of which is extended through the adjacent side wall of the cabinet, which wall has the trunnion 18' of the cylinder also extended therethrough. The shaft 36 of the motor exteriorly of the cabinet is provided with a pulley wheel 37 and mounted upon the trunnion 18' of the cylinder is a second pulley wheel 38, this pulley being of materially greater diameter than the pulley 37, as shown, the two pulleys being connected by a suitable belt 39.

Attached to the upper portion of the cabinet at the back thereof is an electric cable 40 which carries at one end an electric plug 41 by means of which connection may be made with any suitable source of current and this cable is extended, as at 42, downwardly to a switch block 43 where the two wires are attached.

Suitable leads are taken from these wires to the motor 35 while other leads 45 are carried from the switch block 43 to the contacts 46 of the heating plate under the cylinder 17. A suitable switch 47 is interposed in the cable line 42 at the back of the cabinet at any convenient point which controls the flow of current to the motor and to the heating unit 32 so that when the switch is closed the motor and heating unit will be energized simultaneously. From the cable 40 at the upper end thereof there leads a pair of conductors 48 to the heating unit 14 in the heating chamber and the flow of current through these conductors is controlled by a switch 49.

As is clearly shown in Figure 4 the hub 19 of the roasting drum is tubular and adapted to position in this hub is a sampler indicated as a whole by the numeral 50. As shown this sampler comprises a handle portion 51 and an elongated scoop or shell 52 extending from one end thereof. The scoop 52 is of a diameter to permit of its extension through the hub 18 and the handle portion 51 is slightly tapered from the outer to the inner end so as to tightly frictionally engage in the hub to hold the sampler in position. When the handle 51 of the sampler is engaged in the hub as described the scoop will extend a sufficient distance into the drum to catch one or two of the nuts while the drum is rotating so that the attendant may withdraw the same to determine whether or not the contents of the drum are roasted to the proper degree.

From the foregoing description it will be readily seen that the peanut roasting or parching cabinet herein described is of a compact, easily operated nature, and so designed that the roasting cylinder thereof may be easily and quickly charged or emptied as necessary.

In addition to this, novel means is provided for introducing the peanuts into the cylinder and for removing them therefrom and further a portion of the heat employed for heating the cylinder is utilized for keeping the chamber 10 warm to supplement the action of the heater 14.

Having thus described my invention, what I claim is:—

1. A peanut roaster, comprising a casing, a roasting cylinder rotatably mounted in the casing and having a pair of diametrically opposite doors in the wall thereof, a partition within the casing over said cylinder forming an upper warming chamber, a chute opening downwardly through the back wall of the casing toward said cylinder and opening at its lower end adjacent the cylinder in position for access to the door thereof, a door hingedly closing the upper end of said chute, an outlet chute extending downwardly from the lower part of the cylinder through the front wall of the casing and having its inner end in position for access to a door of the cylinder, a door closing the lower end of said outlet chute, heating means for the cylinder, and means for rotating the cylinder.

2. A peanut roaster, comprising a casing, a roasting cylinder rotatably mounted in the casing and having a pair of diametrically opposite doors in the wall thereof, a partition within the casing over said cylinder forming an upper warming chamber, a chute opening downwardly through the back wall of the casing toward said cylinder and opening at its lower end adjacent the cylinder in position for access to the door thereof, a door hingedly closing the upper end of said chute, an outlet chute extending downwardly from the lower part of the cylinder through the front wall of the casing and having its inner end in position for access to a door of the cylinder, a door closing the lower end of said outlet chute, heating means for the cylinder, means for rotating the cylinder, and means for conducting electric current to said heating means and to the cylinder rotating means, whereby the two elements may be simultaneously energized.

3. A peanut roaster, comprising an upright cabinet having a pair of vertically spaced partitions therein forming an upper, a central and a lower chamber, said upper chamber having a pair of transparent walls, a heating element in the upper chamber, a cover removably positioned over and closing the upright chamber, a roasting cylinder rotatably mounted in the central chamber, means for introducing material to and removing material from the roasting cylinder, a heating element beneath said chamber, a motor mounted in the lower cylinder, means for connecting said motor and cylinder for the rotation of the cylinder by the motor, and means for controlling the flow of current to said motor and to the heating elements in the central and upper chambers.

In testimony whereof I hereunto affix my signature.

LAWRENCE WILLIE THOMAS.